(12) United States Patent
Nishihara et al.

(10) Patent No.: US 11,443,233 B2
(45) Date of Patent: Sep. 13, 2022

(54) CLASSIFICATION APPARATUS, CLASSIFICATION METHOD, AND PROGRAM

(71) Applicant: NEC Corporation, Tokyo (JP)

(72) Inventors: Kosuke Nishihara, Tokyo (JP); Norihiko Taya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 16/486,869

(22) PCT Filed: Feb. 20, 2018

(86) PCT No.: PCT/JP2018/005899
§ 371 (c)(1),
(2) Date: Aug. 19, 2019

(87) PCT Pub. No.: WO2018/155412
PCT Pub. Date: Aug. 30, 2018

(65) Prior Publication Data
US 2020/0234186 A1 Jul. 23, 2020

(30) Foreign Application Priority Data

Feb. 21, 2017 (JP) .............................. JP2017-030272

(51) Int. Cl.
*G06N 20/00* (2019.01)
*G06N 5/04* (2006.01)
(52) U.S. Cl.
CPC ............... *G06N 20/00* (2019.01); *G06N 5/04* (2013.01)

(58) Field of Classification Search
CPC .................................. G06N 5/04; G06N 20/00
See application file for complete search history.

(56) References Cited

U.S. PATENT DOCUMENTS 5,329,596 A  7/1994 Sakou et al.
6,647,139 B1 * 11/2003 Kunii ................. G06K 9/00791
                                                  382/159

(Continued)

FOREIGN PATENT DOCUMENTS

JP     H05-73687 A     3/1993
JP     2000-242784 A   9/2000

(Continued)

OTHER PUBLICATIONS

International Search Report for PCT Application No. PCT/JP2018/005899, dated May 29, 2018.

*Primary Examiner* — Li B. Zhen
*Assistant Examiner* — Leah M Feitl

(57) ABSTRACT

A classification apparatus includes: an encoding module that includes an element classification part that extracts a feature of input data and outputs classification information based on an element classification model stored in a first storage unit; an integration module that includes an element estimation part that receives the classification information and converts the classification information to a collation vector based on an element estimation model stored in a second storage unit; and a determination module that includes a determination part that determines a group to which the collation vector belongs by collating the collation vector with a representative vector of an individual group stored as a semantic model in a third storage unit and outputs a group ID of the group as a classification result.

17 Claims, 27 Drawing Sheets

(56) References Cited

U.S. PATENT DOCUMENTS

| | | | |
|---|---|---|---|
| 8,958,609 B2* | 2/2015 | Yasukawa | G06K 9/00288 |
| | | | 382/118 |
| 9,471,830 B2* | 10/2016 | Kawahara | G06K 9/00221 |
| 2002/0143761 A1* | 10/2002 | Shimano | G06F 16/583 |
| 2007/0031001 A1* | 2/2007 | Hamanaka | G06T 15/20 |
| | | | 382/103 |
| 2011/0103700 A1 | 5/2011 | Haseyama | |
| 2012/0236937 A1* | 9/2012 | Kameyama | H04N 19/23 |
| | | | 375/240.08 |
| 2012/0243779 A1* | 9/2012 | Nakai | G06K 9/6262 |
| | | | 382/159 |

FOREIGN PATENT DOCUMENTS

| | | |
|---|---|---|
| JP | 2002-304626 A | 10/2002 |
| JP | 2007-328268 A | 12/2007 |
| JP | 2008-052683 A | 3/2008 |
| JP | 2015-230715 A | 12/2015 |
| WO | 2009/072466 A1 | 6/2009 |

\* cited by examiner

FIG. 3E $X=(x_1, x_2)$    $(p()_s$: SAMPLING WITH PROBABILITY $p$)    SAMPLED VALUES
$Z =$    $(z_1, z_2)$ (2,5)    $(p(\phi|x_1=2)_s, p(\psi|x_2=5)_s) = (1.9, 1.9)$
(3,4)    $(p(\phi|x_1=3)_s, p(\psi|x_2=4)_s) = (2.0, 2.1)$
(5,3)    $(p(\phi|x_1=5)_s, p(\psi|x_2=3)_s) = (1.0, 1.1)$
(4,6)    $(p(\phi|x_1=4)_s, p(\psi|x_2=6)_s) = (2.1, 2.0)$
(1,2)    $(p(\phi|x_1=1)_s, p(\psi|x_2=2)_s) = (3.0, 3.1)$

FIG. 8E $\phi$={STRIPED, FLAT, RETICULATED}
$\psi$={BLACK AND WHITE, GRAY, YELLOW}
$\eta$={MEDIUM NECK, SHORT NECK}

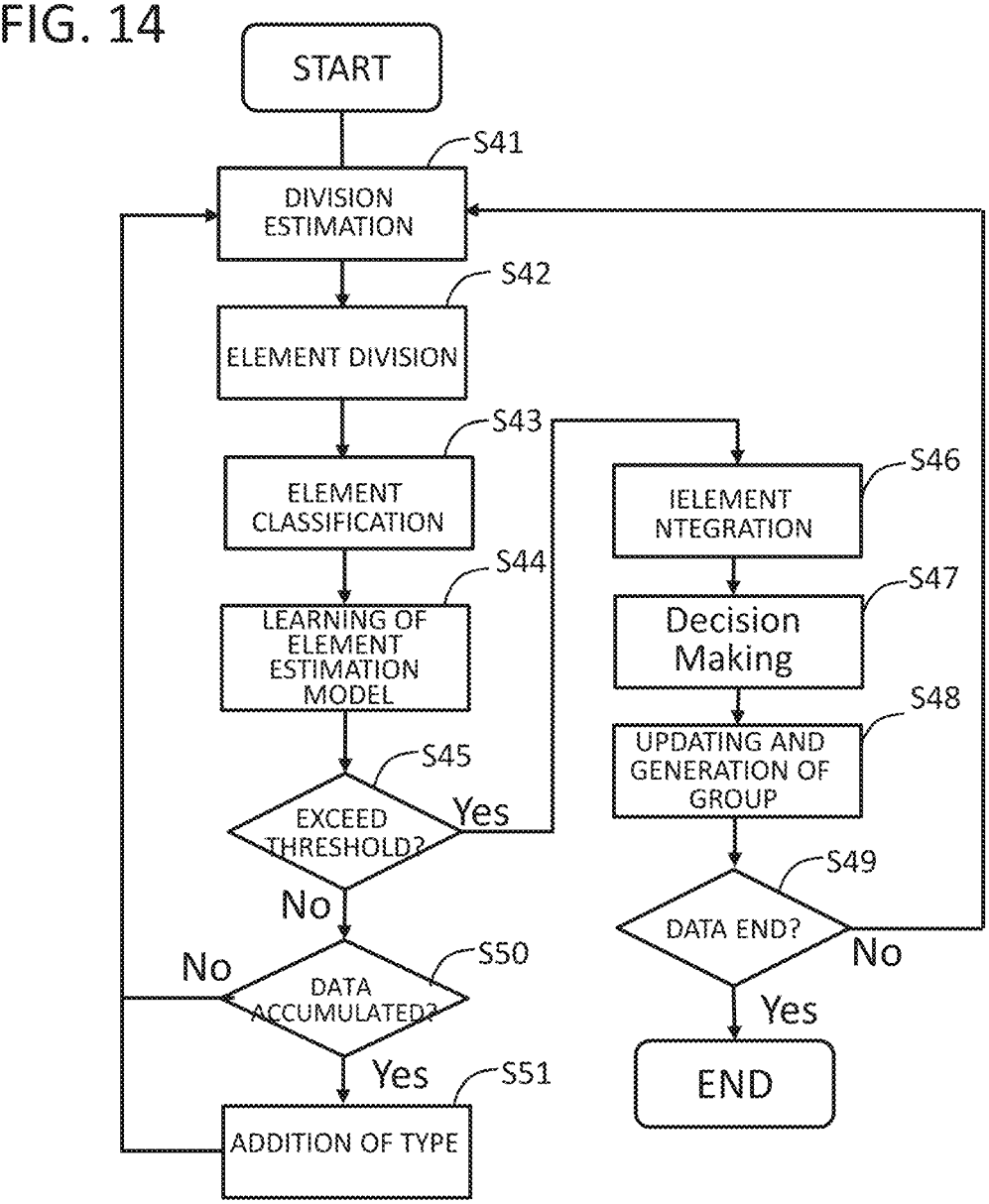

CLASSIFICATION APPARATUS, CLASSIFICATION METHOD, AND PROGRAM

REFERENCE TO RELATED APPLICATION

This application is a National Stage Entry of PCT/JP2018/005899 filed on Feb. 20, 2018, which claims priority from Japanese Patent Application 2017-030272 filed on Feb. 21, 2017, the contents of all of which are incorporated herein by reference, in their entirety.

The present invention relates to a classification apparatus, a classification method, and a program.

BACKGROUND

In many specialized domains, artificial intelligence (AI) technology comparable to human capabilities is used. In image recognition using deep learning technology achieves a recognition rate equivalent to that achieved by humans in a learned classification category. Factory automation has already been put to practical use and has greatly contributed to improvement in productivity. AI in some specific domains has already surpassed human capabilities. In a domain type where a procedure is well defined and an answer is found by numeral calculation, advancement in computer has enabled AI to perform processing more quickly and accurately than humans. Factory automation and Go and Shogi software are examples of use of AI.

Currently, AI is a system that recognizes an event previously defined and acts as previously determined. Identifying in advance an event to be recognized, having AI learn the event, and accurately designing a behavior in advance are the most important. How uncertain elements are removed affects the system performance. AI exhibits sufficient performance in a predicable environment.

A related technique in which, for example, an external stimulus is recognized (classified) is schematically illustrated in FIG. 1, for example. This technique includes an encoding module 102 including a feature extraction part 1021 which receives input data 1011 from an input apparatus 101 that acquires an external stimulus via a sensor not illustrated and outputs the input data 1011 as digital data, extracts a feature amount(s) of the input data 1011, and encodes the feature amount(s) as internal information (feature vector). The technique also includes a determination module 103 including a matching part 1031 which determines a group to which the external stimulus belongs by matching(collating) the internal information from the encoding module 102 and previously stored information and outputs a group identification information (ID) 1032. The external stimulus may be image data acquired by imaging means such as a camera or image data stored in an image database or the like.

As a related technology in which extracts a feature amount to perform clustering, for example, PTL 1 discloses an image classification apparatus which automatically classifies a plurality of items of image data stored in an image database into groups, each group having similar images. This image classification apparatus includes: a feature amount calculation part which calculates an overall feature amount for each of a plurality of items of image data, detects an edge(s) of image data, and calculates a feature amount of the edge portion; a first clustering part which classifies the plurality of items of image data into a plurality of clusters based on the feature amount of overall images; a second clustering part which further classifies the plurality of clusters classified by the first clustering part into a plurality of clusters based on the feature amount of the edge portion; and a cluster integration part which determines, for each of the plurality of items of image data, pixels constituting a subject from a corresponding image composition and integrates the plurality of clusters classified by the second clustering part based on the pixels constituting the respective subjects.

According to the related technology in FIG. 1, it is necessary to define information about how the feature amount is encoded as internal information and classification groups in advance. There is also a known method of manually designing a feature to be extracted and a group, and generating groups by using prepared learning data.

PTL 1: International Publication No. 2009/072466

SUMMARY

The related technology will be analyzed below.

Basically, the related technology described with reference to FIG. 1 cannot be applied to external stimuli that are not defined in advance. Thus, a technique is desired that can determine, even when an unknown stimulus is inputted, a classification group to which the stimulus belongs, while autonomously acquiring recognition and classification groups, for example, in FIG. 1.

The present invention has been made based on recognition of the above issues, and it is an object of the present invention to provide an apparatus, a method, and a program that can determine, even when an unknown stimulus is inputted, a classification group to which the stimulus belongs.

According to a mode of the present invention, there is provided a classification apparatus (a developmental recognition apparatus) including: an encoding module which includes an element classification part that extracts a feature of input data and outputs classification information based on an element classification model stored in a first storage unit; an integration module which includes an element estimation part that receives the classification information and converts the classification information to a collation vector based on an element estimation model stored in a second storage unit; and a determination module which includes a determination part that determines a group to which the collation vector belongs by collating the collation vector with a representative vector of an individual group stored as a semantic model in a third storage unit and outputs a group ID (Identification: w identification information) of the group as a classification result. For example, the input data may be digital data or the like obtained by sensing of an external stimulus performed by a sensor or the like.

According to a mode of the present invention, there is provided a classification method (a developmental recognition method) performed by a computer, the classification method including:

an encoding process of extracting a feature of input data and outputting classification information based on an element classification model stored in a first storage unit;

an integration process of receiving the classification information and converts the classification information to a collation vector based on an element estimation model stored in a second storage unit; and a determination process of determining a group to which the collation vector belongs by collating the collation vector with a representative vector of an individual group stored as a semantic model in a third storage unit and outputting a group ID of the group as a classification result.

According to a mode of the present invention, there is provided a program (a developmental recognition program) causing a computer to execute:

an encoding process including an element classification process that extracts a feature of input data and outputting classification information based on an element classification model stored in a first storage unit;

an integration process that includes an element estimation process that receives the classification information and converts the classification information to a collation vector based on an element estimation model stored in a second storage unit; and a determination process that determines a group to which the collation vector belongs by collating the collation vector with a representative vector of an individual group stored as a semantic model in a third storage unit and outputs a group ID of the group as a classification result.

According to the present invention, there is provided a non-transitory computer-readable recording medium holding the above program (for example, a semiconductor storage (such a random access memory (RAM), a read-only memory (ROM), or an electrically erasable and programmable ROM (EEPROM)), a hard disk drive (HDD), a compact disc (CD), or a digital versatile disc (DVD)).

According to the present invention, even when an unknown stimulus is inputted, a classification group to which the stimulus belongs can be determined.

BRIEF DESCRIPTION OF DRAWINGS

FIG. 3E is a diagram illustrating the first example embodiment.

FIG. 8E is a diagram illustrating the second example embodiment.

FIG. 14 is a flowchart for illustrating an operation example according to the third example embodiment.

DETAILED DESCRIPTION

A system according to one of embodiments of the present invention includes an encoding module (for example, 20 in FIG. 2) that converts input data such as stimulus information inputted from outside the system to a batch of a plurality of elements and takes in the plurality of elements as internal information, an integration module (for example, 30 in FIG. 2) that converts an individual element to an interpretable representation expression and integrates the representation expressions as a vector, and a determination module (for example, 40 in FIG. 2) that maps the vector on a semantic space and determines a recognition and classification group. By updating a representation expression and a recognition and classification group in coordination, a representation expression that could not be expressed for new input can be acquired, and unknown stimuli distributed on the semantic space can be made to converge to a recognition and classification group which is discriminable from one or more known groups.

The system, which is provided with the integration module (30), in addition to the encoding module (20) and the determination module (40), can autonomously acquire a recognition and classification group and a representation expression to enhance discrimination ability, while gradually increasing the number of recognition and classification groups.

Example Embodiment 1

Figure 1:
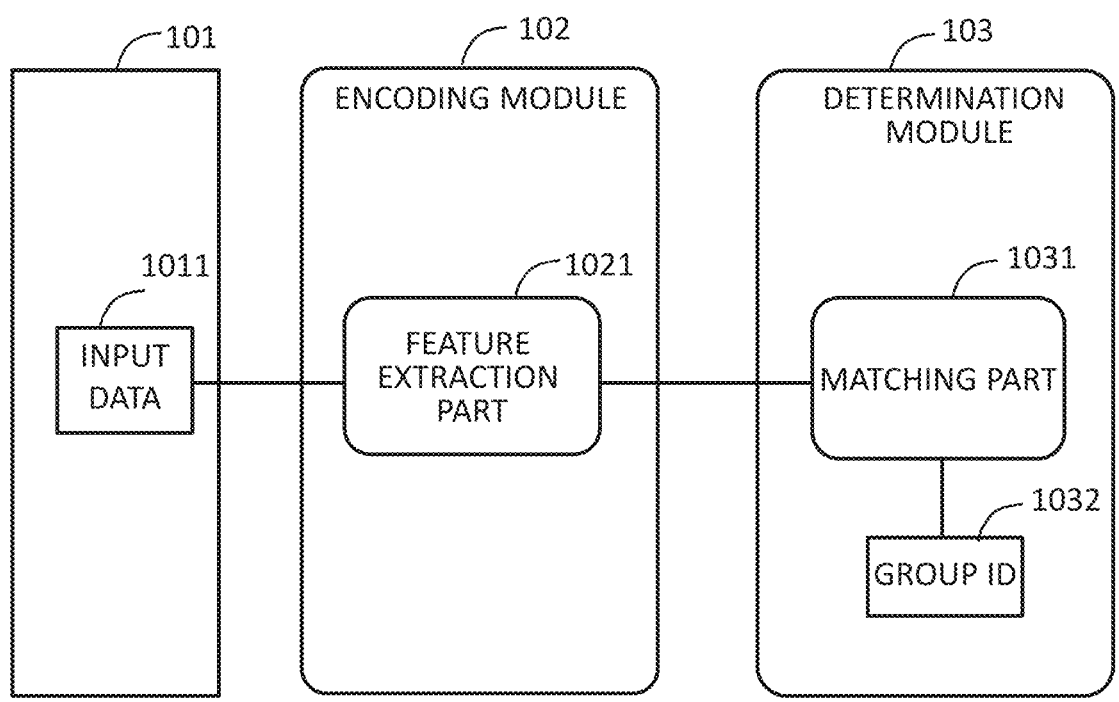
FIG. 1 is a diagram illustrating a related technology.
Figure 2:
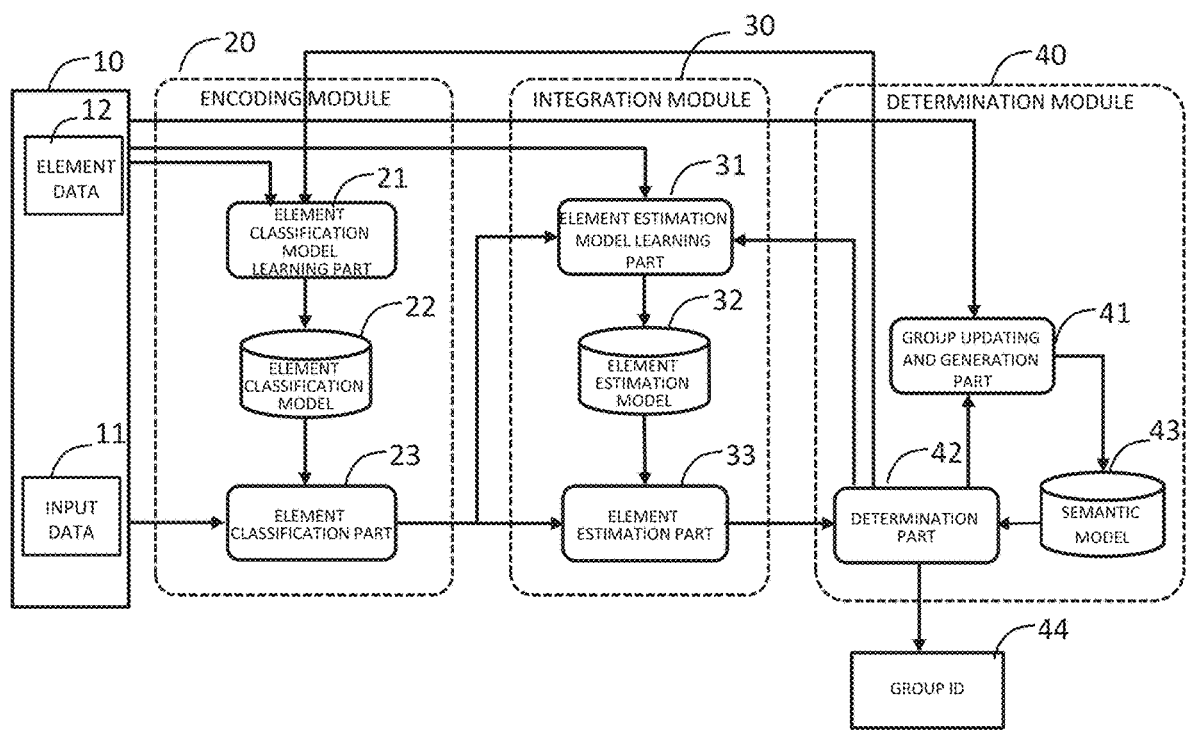
FIG. 2 is a diagram illustrating a configuration example according to a first example embodiment.

The following describes a first example embodiment with reference to drawings. FIG. 2 illustrates an example of a system configuration according to an example embodiment of the present invention. A classification system 1 according to the first example embodiment includes an input apparatus 10, an encoding module 20, an integration module 30, and a determination module 40. These modules may have such an apparatus configuration in which they are provided in a single unit. In this case, the classification system 1 is configured as a classification apparatus (classifier). Alternatively, the input apparatus 10, the encoding module 20, the integration module 30, and the determination module 40 may be respectively implemented as individual apparatuses and may be communicatively connected with each other via communication means. Still alternatively, for example, a combination of the integration module 30 and the determination module 40 may be implemented on a server or the like, and the input apparatus 10 and the encoding module 20 may be implemented on a network node or the like that is communicatively connected with the server.

In FIG. 2, while each arrow indicates a direction of information/a signal between units, this is only an example for illustrating a feature according to the present example embodiment and signal transmission and reception is not limited to be unidirectional. Namely, a configuration in which a signal is transmitted and received bi-directionally between units (a handshake or transmission and reception of a control signal, etc. between modules) is not excluded. The same holds true for FIGS. 3A, 4, 5, and 12.

In FIG. 2, the encoding module 20 receives input data from the input apparatus 10 that receives an external stimulus or the like and acquires the input data as internal information that can be processed inside the encoding module 20. Though not limited thereto, the input apparatus 10 may be a sensor, a camera, or the like. For example, the sensor may be a device configured to sense any one of vibration information, current/voltage, temperature information, smell, biometric information, image information, acoustic information, etc. The input apparatus 10 may include an Internet-of-things (IoT) device that includes wired or wireless communication means and may be communicatively connected with the encoding module 20 via a network. Alternatively, the input apparatus 10 may be an interface module or a controller that reads and inputs sensing data or image data already stored in a storage apparatus such as a database.

The integration module 30 converts the acquired information to element information needed for collation and generates an integrated vector.

The determination module 40 collates the integrated vector with a representative vector of a semantic model (a representative vector of a classified group) and outputs a recognition result (a group ID) 44 corresponding to the external stimulus.

More specifically, the encoding module 20 includes an element classification part 23, an element classification model learning part 21, and a storage apparatus 22 to store an element classification model.

The element classification model learning part 21 creates a feature targeted for extraction from the input data (element data) and stores an element classification model in the storage apparatus 22. The element classification model learning part 21 may perform learning with a group ID determined by the determination module 40 as an input.

Based on the element classification model stored in the storage apparatus 22, the element classification part 23 extracts and classifies a feature of the input data per element data and outputs classification information, which is a group of the classified element.

The integration module 30 includes an element estimation model learning part 31, an element estimation part 33, and a storage apparatus 32 to store an element estimation model.

The element estimation model learning part 31 creates an element expression based on the classification information outputted from the element classification part 23 of the encoding module 20 and the input data (element data) and stores the element expression in the storage apparatus 32 as an element estimation model. The element estimation model learning part 31 may perform learning with a group ID determined by the determination module 40 as an input.

The element estimation part 33 receives the classification information outputted from the element classification part 23 of the encoding module 20, converts the classification information to an element expression used for collation with reference to the element estimation model stored in the storage apparatus 32, and outputs the element expression to the determination module 40.

The determination module 40 includes a determination (decision-making) part 42, a group updating and generation part 41, and a storage apparatus 43 to store a semantic model.

The group updating and generation part 41 creates a recognition and classification group from integrated information and stores the recognition and classification group in the storage apparatus 43 as a semantic model.

The determination part 42 collates the classification information outputted from the element estimation part 33 of the integration module 30 with a learned semantic model stored in the storage apparatus 43 and determines a recognition and classification group which is classified.

Figure 3A:
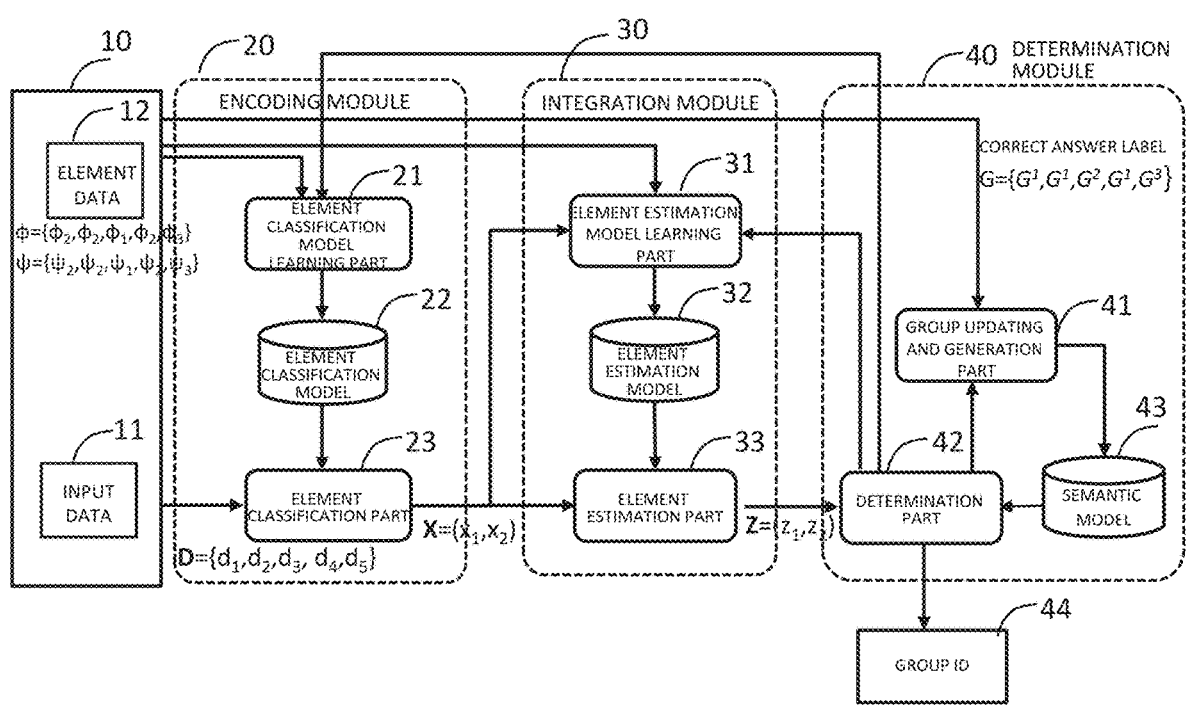
FIG. 3A is a diagram illustrating the first example embodiment.
Figure 3B:
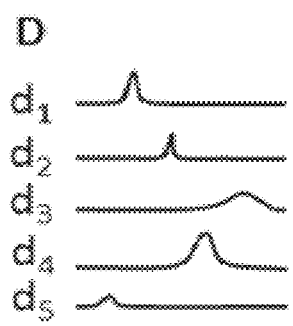
FIG. 3B is a diagram illustrating the first example embodiment.
Figure 3C:
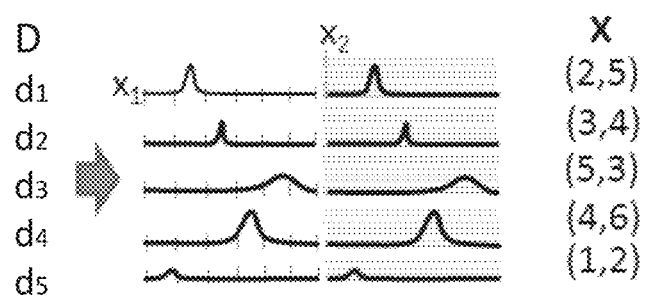
FIG. 3C is a diagram illustrating the first example embodiment.

FIGS. 3A to 3G illustrate an operation principle of the classification system 1 in FIG. 2 in view of data (information) flow in the classification system 1. FIG. 3A illustrates a configuration in FIG. 2 and data (information). FIGS. 3A to 3G only illustrate operation examples according to the first example embodiment, and therefore, data structure, content, expression, etc. are, as a matter of course, not limited to the examples in FIGS. 3A to 3G. D=(d1, d2, d3, d4, d5) to the encoding module 20. FIG. 3B illustrates an example of the data=(d1, d2, d3, d4, d5). In FIG. 3B, a vertical axis indicates, for example, magnitude of data, and a horizontal axis indicates, for example, location, time or another parameter, and is classified into regions of a fixed size.

The element classification part 23 receives input data D=(d1, d2, d3, d4, d5), extracts a feature of the input data based on an element classification model stored in the storage apparatus 22, and outputs classification information, which is an element classification group, X=(x1, x2). In the classification information X, x1 represents a region (number from front) where a peak of a waveform of data in FIG. 3B resides. The division information X=(x1, x2)=(2, 5) corresponding to d1 represents that the data d1 has a peak in a region 2 and a value of the peak is 5. This division information X=(x1, x2) corresponds to a feature extracted from the data (see FIG. 3C). The element x1 is subjected to classification based on an element classification model corresponding to element data (type) $\phi=\{\phi1, \phi2, \phi3, \ldots\}$. The element x2 represents a magnitude of the peak. The element x2 is subjected to classification based on an element classification model corresponding to element data (type) $\psi=\{\psi1, \psi2, \ldots\}$.

The element classification model learning part 21 creates an element classification modes based on the element data $\phi=\{\phi2, \phi1, \phi1, \phi2, \phi3\}$ and $\psi=\{\psi2, \psi1, \psi1, \psi2, \psi3\}$ and stores the element classification models in the storage apparatus 22. The element data $\phi$ is constituted by location (region) of a peak (hill) of a waveform of the input data, and $\{\phi2, \phi1, \phi1, \phi2, \phi3\}$ represents an ensemble of types (peak locations). The element data $\psi$ is constituted by a peak value, etc., and $\{\psi2, \psi1, \psi1, \psi2, \psi3\}$ represents an ensemble of peak values corresponding to the locations of the peaks.

The division information X=(x1, x2) (see FIG. 3C) outputted from the element classification part 23 is supplied to the element estimation part 33 and the element estimation model learning part 31 of the integration module 30. The element estimation model learning part 31 may be configured to receive the division information X=(x1, x2) when learning an element estimation model.

Figure 3D:
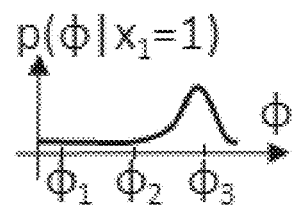
FIG. 3D is a diagram illustrating the first example embodiment.

Based on the element estimation model stored in the storage apparatus 32, the element estimation part 33 converts the division information to an element expression vector Z=(z1, z2) and outputs the element expression vector Z to the determination module 40. FIG. 3D schematically illustrates one of the element estimation models stored in the storage apparatus 32. While FIG. 3D illustrates only p (φ|x1=1) as an example for convenience of formulation of the drawing, the element estimation model stored in the storage apparatus 32 may include probability distributions other than p(φ|x1=1), such as p(φ|x1=2) and p(φ|x2=5), may be stored as an element estimation model.

In FIG. 3D, p(φ|x1=1) is a probability (conditional probability) with which the element data (type) is φ when x1=1 is given in the case of the inputted classification information X=(x1, x2). Likewise, p(φ|x2=1) is a probability (conditional probability) with which the element data (type) is ψ when x2=1 is given. In the element estimation model in FIG. 3D, element data φion the horizontal axis of p(φ|x1=1) is φ1, φ2, and φ3. In the case of the element estimation model in FIG. 3D, the probability p(φ|x1=1) has a distribution in which the highest value is around φ3.

Based on the element estimation model (probability p(φ|x1)) illustrated as an example in FIG. 3D, the element estimation part 33 performs sampling of type φk(k=1, . . . , 3) and sets a sampled value as an element z1 of a vector Z. Though not limited thereto, for example, the element estimation part 33 finds a most probable φ(≈φ3) with respect to x1=1 in FIG. 3D, by using Naive Bayes or the like (the probability p(φ|x1=1) takes the largest vale) (z1 will be a value close to 3 when assuming that φ1, φ2, and φ3 on the horizontal axis φ in FIG. 3D are quantified as 1, 2, and 3, respectively).

Likewise, based on the element estimation model (probability p(ψ|x2)), the element estimation part 33 performs sampling of type ψk(k=1, 2, . . . ) and determines an obtained value as the element z2 of the vector Z. In this operation, for example, the element estimation part 33 may find the most probable ψ with respect to x2=5 (the largest probability p(ψ|x2=5) takes the largest value).

FIG. 3E illustrates the correspondence between the classification information X=(x1, x2) inputted to the element estimation part 33 and the expression vector (collation vector) Z=(z1, z2) which is obtained by sampling X=(x1, x2) using the probabilities p(φ|x1) and p(ψ|x2). The element estimation part 33 may have a Bayesian Attractor configuration.

Figure 3F:
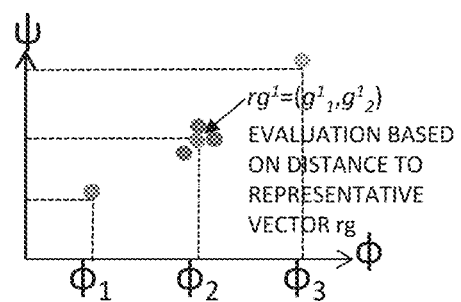
FIG. 3F is a diagram illustrating the first example embodiment.

As illustrated in FIG. 3F, the determination part (decision making) 42 determines a group (group ID) 44 to which the vector Z belongs, based on a distance between the vector Z=(z1, z2) (FIG. 3E) and a representative vector rg1=(g11, g12) of an individual group stored in the storage apparatus 43 as a semantic model. In the example in FIG. 3F, in 2 dimension space (φ, ψ), a group corresponding to the shortest distance between the vector Z (indicated by a dot) and the representative vector rg$^1$ (indicated by an arrow) is determined. If the distance to the representative vector rg1=(g11, g12) of the group is a predetermined threshold or more, the group updating and generation part 41 may generate a new group.

Figure 3G:
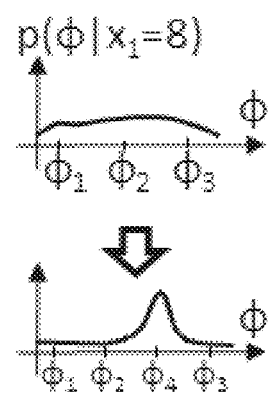
FIG. 3G is a diagram illustrating the first example embodiment.

In the example in FIG. 3G, in a case of x1=8, φ4 is newly added to the element data (type) φ (φ becomes {φ1, φ2, φ3, φ4}). Consequently, a value (frequency) is high at φ4 (the probability p(φ4|x1=8) increases). FIG. 3G illustrates a situation in which grouping corresponding to φ4 is performed and a classification accuracy is improved.

When the probability p(φ|x1) does not exceed a predetermined threshold, the element estimation model learning part 31 may add the new type φ4, for example, based on a notification (for example, a group ID) from the determination part 42 (the same holds true for the probability p(ψ|x2)).

The group updating and generation part 41 may receive a correct answer label G={G1, G1, G2, G1, G3} (a correct answer label of a group) from the input apparatus 10 and generate the representative vector of a classification group stored as a semantic model in the storage apparatus 43. The group updating and generation part 41 may update the representative vector of a classification group stored as a semantic model in the storage apparatus 43 based on a vector Z from the determination part 42.

Figure 4:
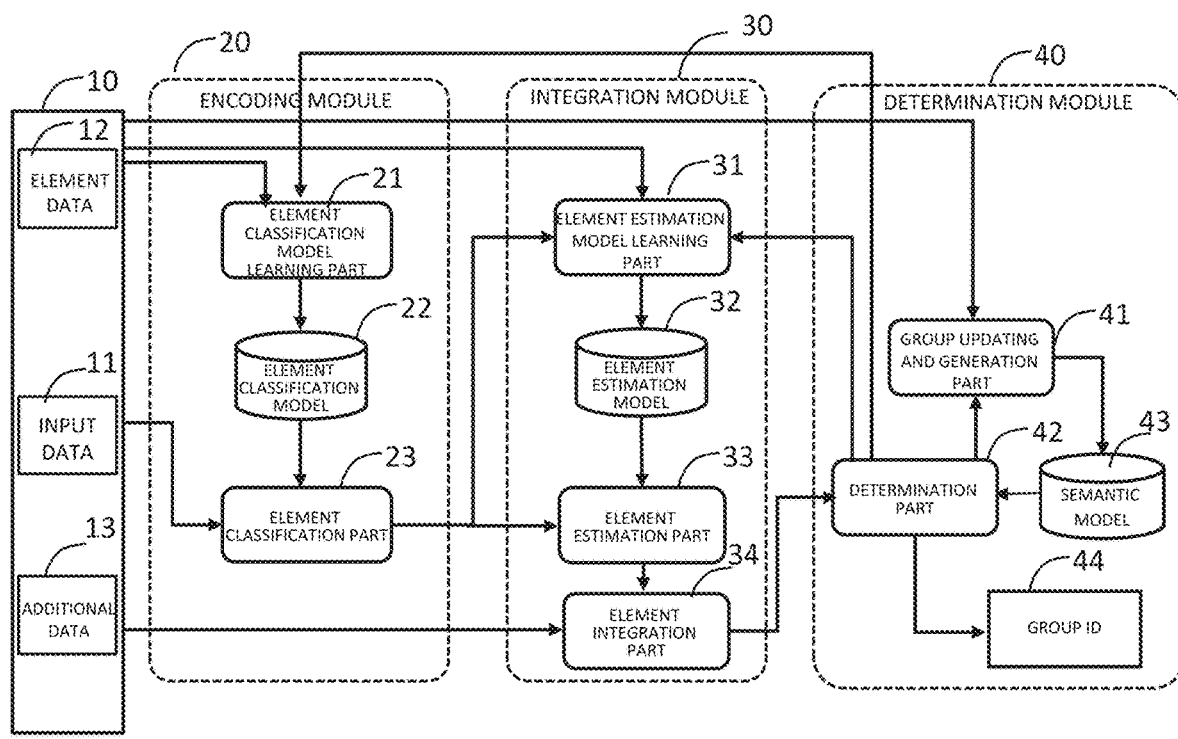
FIG. 4 is a diagram illustrating another configuration example according to a first example embodiment.

FIG. 4 illustrates another configuration example according to the first example embodiment. As illustrated in FIG. 4, the integration module 30 includes an element integration part 34 that generates a vector (integrated vector) by integrating additional data 13 inputted from the input apparatus 10 with an expression vector Z outputted from the element estimation part 33 and outputs the vector to the determination module 40. For example, the additional data 13 is attribute information of the input data 11 and is inputted in association with the input data 11. If the input data 11 is image data including an animal as a subject, as will be described below, the additional data 13 may be attribute information (digital signal) such as animal call or the like (feature(s)).

Example Embodiment 2

Figure 5:
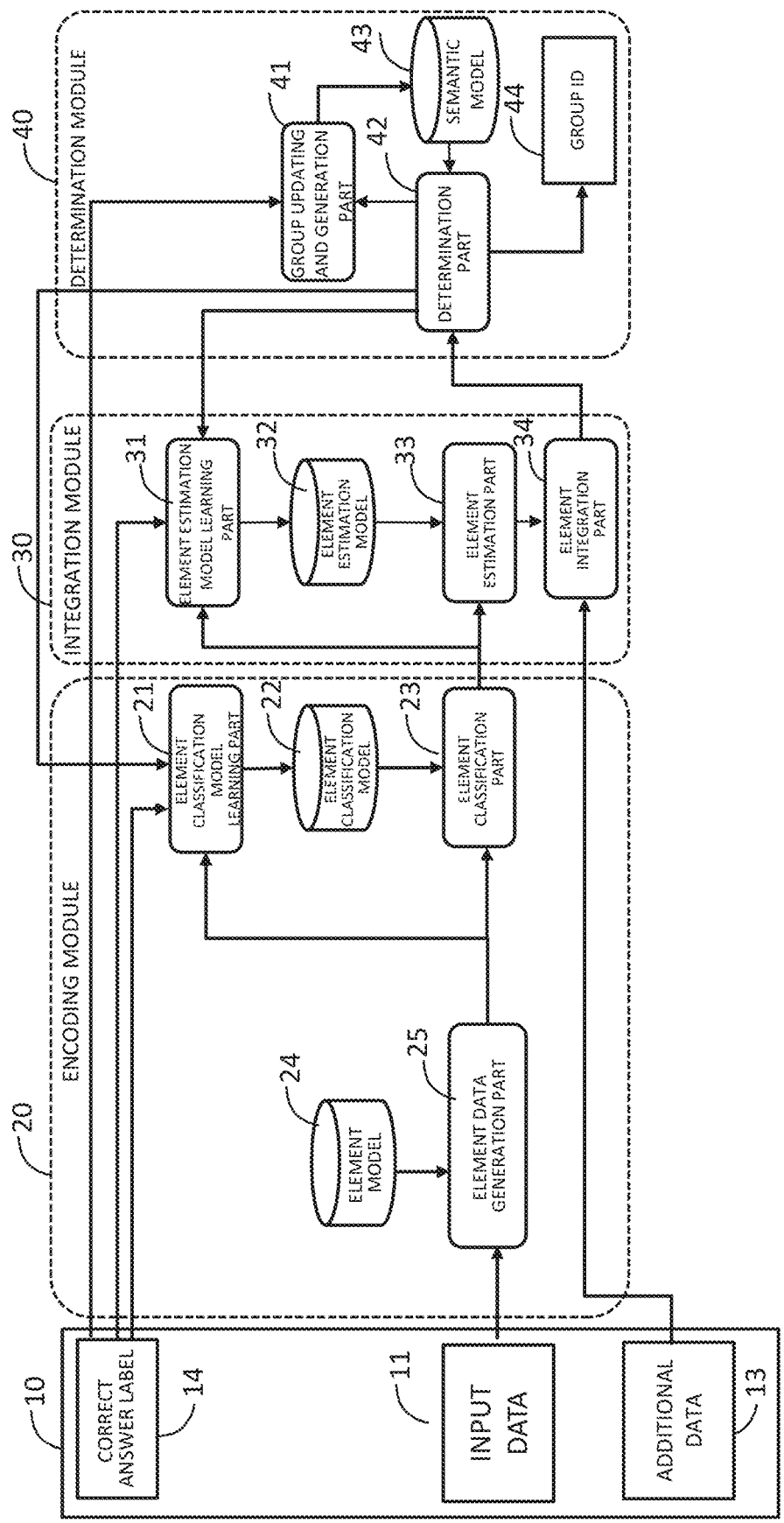
FIG. 5 is a diagram illustrating a configuration example according to a second example embodiment.

FIG. 5 illustrates a configuration according to a second example embodiment of the present invention. As illustrated in FIG. 5, an encoding module 20 includes an element data generation part 25, in addition to the configuration in FIG. 2.

The element data generation part 25 converts input data inputted from an input apparatus 10 to data needed for classification by referring to an element model stored in a storage apparatus 24. The conversion method is stored in advance as an element model in the storage apparatus 24.

The element data generation part 25 may generate a plurality of kinds of data and output each of the generated data to an element classification part 23.

Though not limited thereto, for example, the data conversion performed by the element data generation part 25 is at least one of the following:
binarization conversion,
frequency conversion,
color space conversion,
object extraction, and
conversion using various signal processing filters.

The element classification part 23 extracts a feature per generated element data, classifies the feature, and outputs data which is a collection of element classification.

An element classification model learning part 21 creates a feature to be extracted per generated data and stores the feature as an element classification model in a storage apparatus 22. As the classification learning, supervised learning using a correct answer label 14 may be performed. Alternatively, unsupervised learning may be performed based on self-organizing maps (SOM).

An element estimation part 33 of an integration module 30 receives the element classification set outputted from the element classification part 23 of the encoding module 20 and converts the element classification set to a learned interpretable representation expression vector.

The classification result has a distribution from a true value due to an observation error. In addition, designing is not always made in such a manner that the classification result is expressed as being interpretable by humans. This is especially prominent in a case where the classification learning is performed based on unsupervised learning.

The element estimation part 33 converts the element classification on the divided elements to a stable representation expression that can be interpreted by humans. The element estimation part 33 performs the conversion by referring to an element classification model per element. The following example will be made, assuming that, with regard to an element k, the inputted classification result is Xk and the type obtained as a result of the conversion is $\phi k$.

A probability $pk(\phi k|Xk)$, with which conversion to $\phi k$ is performed when Xk is given, is stored as an element classification model. The element estimation part 33 performs sampling of the type $\phi k$ based on this probability and sets the sampled value as an element of the expression vector Z. The expression vector Z is also referred to as a representation expression vector.

An element estimation model learning part 31 generates an element classification model by using learning data in advance and stores the element classification models in a storage apparatus 32.

Figure 6:
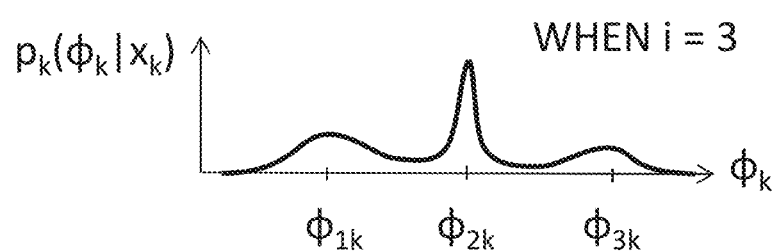
FIG. 6 is a diagram illustrating the second example embodiment.

Assuming that there are i kinds of representation that can be obtained with regard to the element k, and the i-th type is $\phi ki$, $pk(\phi k|Xk)$ is constituted in accordance with frequencies of respective types. In the example in FIG. 6, three kinds (i=3) of representation can be obtained with regard to the element k. For example, there is created a conditional probability $pki(\phi ki|Xk)$ with which learning data is $\phi ki$ when classification information Xk is given by the element classification part 23. The individual $\phi ki$ is a discrete value defined on a corresponding element axis $\phi k$, and $pk(\phi k|Xk)$ is created as a probability with which the probability pki ($\phi ki|Xk$) is approximated by using a corresponding value. For example, $pk(\phi k|Xk)$ can be formed as a sum of standard distributions (standard normal distributions) in which a probability value or data numbers is used as a parameter.

Regarding the learning data used in a prior learning, the value of the type $\phi ki$ is defined based on similarity or the like between(among) the types $\phi ki$. It is noted that the representation expression of a single element is not limited to a one-dimensional expression. The representation expression can be extended to an N-dimensional (N is an integer of 2 or more).

Figure 7A:
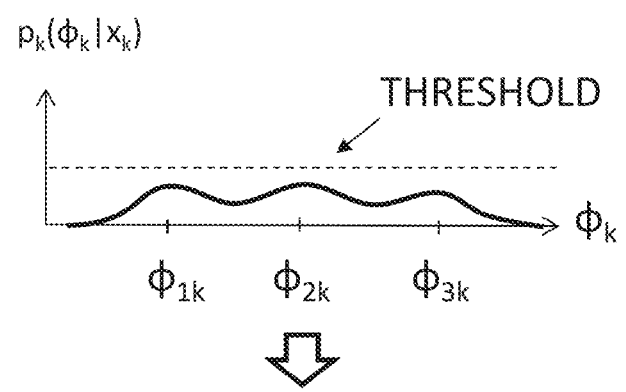
FIG. 7A is a diagram illustrating the second example embodiment.
Figure 7B:
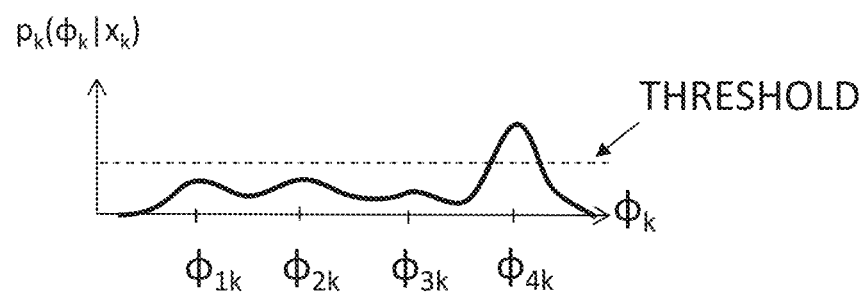
FIG. 7B is a diagram illustrating the second example embodiment.

When the element estimation is performed, if the probability $pk(\phi k|Xk)$ or the probability $pki(\phi ki|Xk)$ of any of the types $\phi ki$ does not exceed a predetermined threshold, the element estimation model learning part 31 can add a new type $\phi ki$ autonomously or in accordance with an instruction from outside. In FIG. 7A, all the probabilities $pki(\phi ki|Xk)$ of types $\phi 1k$ to $\phi 3k$ are below a threshold. Thus, a new type $\phi 4K$ is added, as illustrated in FIG. 7B. Namely, the number of types is increased by one.

The element estimation model learning part 31 autonomously adds a new type when the probability of an element other than k is high at a specific type. Namely, there is a case where, while an element cannot be expressed by existing representations when viewed only on a k axis, the element can be expressed by an existing representation when viewed on another axis.

When learning the probability of the newly added type $\phi ki$, the element estimation model learning part 31 uses only Xk corresponding to the input data that may converge to an existing type on another axis. Aside from that, the element estimation model learning part 31 may be instructed to modify a probability so that an existing type will be a correct answer, without adding a type. A value given to a new type may be determined based on a similarity to an existing type. Alternatively, a value given to a new type may be determined in accordance with an instruction given from outside or a rule such as increment.

Though not limited thereto, an example in which, for example, texture, color, and shape may be used as an example of an element data will be described. The corresponding element classification are classification by frequency spectra, color spectra, and extracted objects.

For example, as learning data, there are prepared the following:

texture type $\phi 1$ is {flat, striped, reticulated, etc.},
color type $\phi 2$ is {yellow, gray, brown, etc.},
shape type $\phi 3$ is {long neck, short neck, medium neck, ... } and so forth.

When the input data is an image of a tiger and an image of a giraffe, the tiger is expressed as (striped, yellow, short neck), and
the giraffe is expressed as (reticulated, yellow, long neck), for example. While an example in which the input data is image has been described, the input data is not, as a matter of course, limited to image. While notation in which an index k (k=1, 2, 3, ... ) is used to distinguish a type $\phi k$ such as $\phi 1$, $\phi 2(\phi 3)$, etc., $\phi$, $\psi(\eta)$, etc. will be used in place of $\phi 1$, $\phi 2(\phi 3)$, etc. for ease of visibility in FIGS. 8B to 8E, etc.

An element integration part 34 appends additional data 13 received as a new element from the input apparatus 10 to the expression vector Z and outputs an integrated vector. Though not limited thereto, the additional data may be an attribute such as a call or smell which may be inputted, for example, in association with the input data D, for example (for example, the input data 11 and the additional data 13 may be inputted as a pair).

A determination part (decision making module) 42 searches for a representative vector rg closest to the inputted integrated vector Z and outputs a group to which the representative vector rg belongs as a group ID 44. A representative vector rg is a vector that represents a recognized classification group defined on a semantic space.

Regarding a closeness between vectors, for example, a distance is evaluated based on a weighted square sum. Assuming that a weight is wi, the integrated vector is zi, and rgi of a group g is a representative vector, a distance g is given as follows. In the following formula, $\Sigma i$ is a summation operator. In this example, summation corresponding to the number of groups is performed.

$$\text{Distance } g = \Sigma_i wi * |zi - rgi|^2$$

When the distance between the integrated vector and any of the representative vectors is equal to or more than a predetermined threshold, it is decided that a group is an unknown group.

In the above distance g, the weight wi is a parameter for setting importance of a specific element and is referred to as "selective attention". The weight may simply be set statically based on a purpose of recognition or set from outside. Alternatively, the weight may be set dynamically, for example, based on a classification accuracy of the element classification part 23.

The number of recognition and classification groups or the representative vectors are stored in a storage apparatus 43 as a semantic model.

A group updating and generation part 41 generates and updates a representative vector of a classification group based on the integrated vector and a correct answer label. The integrated vector may be acquired from the determination part 42. The correct answer label 14 is acquired from the input apparatus 10. For example, a representative vector is a median value of vectors having the same label. The group updating and generation part 41 may update the representative vector of the determined group by using the integrated vector identified by the determination part 42.

The group updating and generation part 41 may perform the following processing such as

- updating the representative vector to be a median value of all the past vectors belonging to the corresponding group,
- setting a certain window (a time window) and updating the representative vector to be a median value of recently used vectors, or
- determining the degree of contribution of updating or whether updating has been performed, based on the classification accuracy of the element classification part 23.

The group updating and generation part 41 may generate a new group by using the integrated vector identified to be an unknown group by the determination part 42.

When a predetermined number of vectors identified to be unknown are distributed within a specific radius on the semantic space, the group updating and generation part 41 generates a representative vector which is a median value of the vectors and stores a new group in the storage apparatus 43 as a semantic model.

Figure 8A:
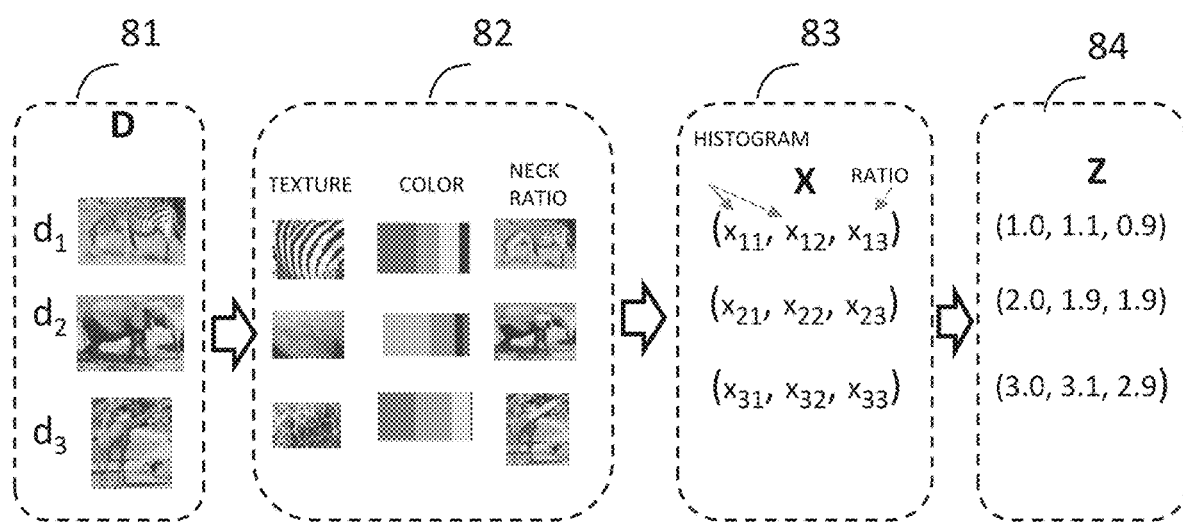
FIG. 8A is a diagram illustrating the second example embodiment.

FIGS. 8A to 8E illustrate a specific example of data processing of the system according to the second example embodiment described with reference to FIG. 5. The following example assumes that the following data is set as element data in the element classification model as illustrated in FIG. 8E.

$\phi$={striped, flat, reticulated}={$\phi 1$, $\phi 2$, $\phi 3$},
$\psi$={black and white, gray, yellow}={$\psi 1$, $\psi 2$, $\psi 3$},
$\eta$={medium neck, short neck}={$\eta 1$, $\eta 2$}.

In FIG. 8A, image data (still images) of d1 (zebra), d2 (elephant), and d3 (giraffe) are inputted as input data D (81).

The element data generation part 25 generates element data (82) of texture, color, and neck ratio from each of the input data D={d1, d2, d3}. The element classification part 23 classifies the feature of the element data based on an element classification model ($\phi$, $\psi$, $\eta$) and outputs classification information X1=(x11, x12, x13), (x21, x22, x23), and (x31, x32, x33) (83) corresponding to the input data D{d1, d2, d3}. Each of the elements (x11, x12), (x21, x22), and (x31, x32) is a histogram, and each of the elements x13, x23, and x33 is a ratio, for example.

The element estimation part 33 receives the classification information X=(x1, x2, x3) and outputs an expression vector Z=(z1, z2, z3) (84) in FIG. 8A based on the element estimation model. In this example, the element integration part 34 outputs the expression vector Z as an integrated vector to the determination part 42 without appending additional data.

Figure 8B:
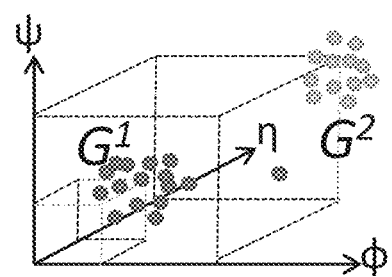
FIG. 8B is a diagram illustrating the second example embodiment.

As illustrated in FIG. 8B, the determination part 42 determines a group ID to which the vector Z belongs, based on the distance between the vector Z from the integration module 30 and the representative vector rg of respective groups $G^1$, $G^2$, etc.

Figure 8C:
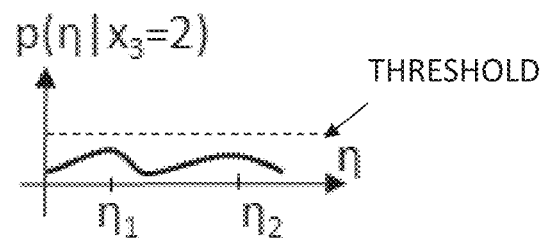
FIG. 8C is a diagram illustrating the second example embodiment.
Figure 8D:
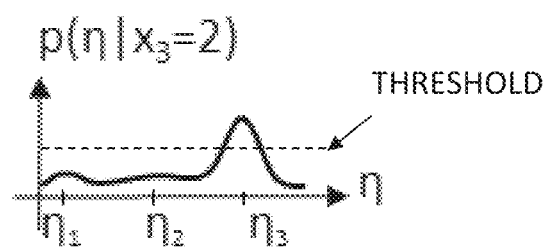
FIG. 8D is a diagram illustrating the second example embodiment.

The element estimation model learning part 31 may be configured to add a new type $\eta 3$ when the probabilities $p(\eta|x3=2)$ of the types $\eta 1$ and $\eta 2$ do not exceed a predetermined threshold. In FIG. 8C, both of the probabilities $p(\eta|x3=2)$ of the types $\eta 1$ and $\eta 2$ do not exceed a predetermined threshold. Thus, as illustrated in FIG. 8D, a new type 113 (long neck) is added. In this way, it is made possible to perform classification based on the type $\eta 3$ (long neck) and to increase resolution.

Next, an operation according to the second example embodiment will be descried.

First, an operation of determining a group will be described with reference to FIG. 9.

The element data generation part 25 converts the input data to data needed for classification (step S11).

For example, the element data generation part 25 performs frequency conversion, color space conversion, or object extraction on an input image and outputs a frequency spectrum, a color spectrum, or an object. Frequency conversion and color space conversion may be performed on an extracted object.

The element classification part 23 performs feature extraction and classification for each item of generated data and outputs an element classification aggregate data having each classification result as an element (step S12).

For example, the element classification part 23 generates a data aggregate having classification probabilities by using a neural network, a support vector machine (SVM), or the like, about the individual frequency spectrum or color spectrum.

Regarding an object, the element classification part 23 extracts a sub-region of the object and generates coordinate values for each of one or more regions. The element classification part 23 refers to the element classification model for the number of classifications and the number of regions.

The element estimation part 33 converts the inputted data aggregate to a representation expression vector (step S13).

It is assumed that the element is designated by k (k is defined as any one of values 1 to 3 corresponding to frequency, color, and object). Each of the element classification is converted to an element (texture, color, shape) of a corresponding representative vector. Each type that the representation can take is already learned. For example, the texture is {flat, striped, reticulated}, the color is {yellow, gray, brown}, and the shape is {vertically long, horizontally long, square}.

An element k of the representation expression vector is generated based on a conditional probability when a classified element Xk is given. When a type that can be taken is $\phi ki$, the probability is given as pki($\phi ki|Xk$).

The following example assumes that $\phi 11=1$, $\phi 12=2$, and $\phi 13=3$, when k=1 (texture) (flat, striped, and reticulated will be denoted by 1, 2, and 3, respectively).

A probability p1($\phi 1|Xk$) that gives a texture type is constituted on this texture axis, and sampling is performed based on this probability.

The element integration part 34 adds additional data (additional information) 13 as a new element to the representation expression vector and outputs an integrated vector (step S14). The additional information is an attribute value related to an input and information derived from other modality such as call and/or smell may also be integrated.

The determination part 42 searches for a representative vector closest to the inputted integrated vector and outputs a group to which the representative vector belongs as a group ID (step S15).

The closeness between vectors is evaluated based on a weighted square sum, where the weight may be given from outside depending on a purpose.

The group updating and generation part 41 updates a searched representative vector by using the inputted integrated vector (step S16).

Figure 9:
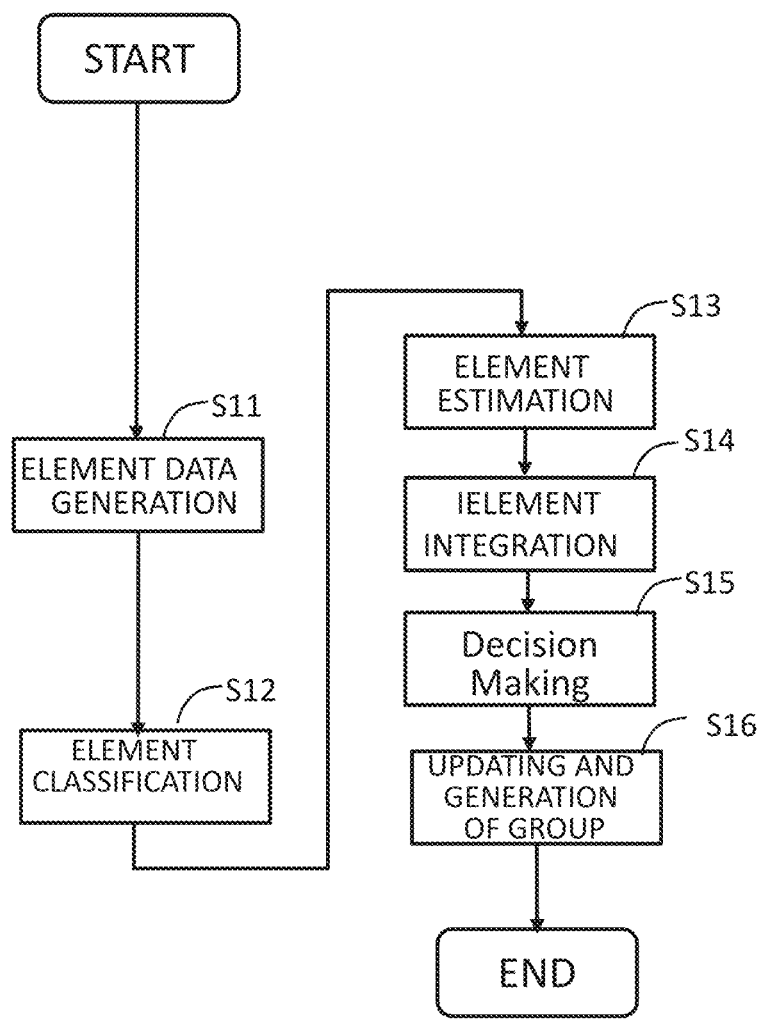
FIG. 9 is a flowchart for illustrating an operation example according to the second example embodiment.

In step S15 in FIG. 9, the determination part 42 searches for a representative vector closest to the inputted integrated vector. If a distance between the integrated vector and any one of the representative vectors is greater than or equal to a threshold, the determination part 42 determines that the inputted integrated vector belongs to an unknown group and outputs an unknown group ID.

In this case, in step S16, when a predetermined number of integrated vectors having an unknown group ID are distributed within a specific radius on the semantic space, the group updating and generation part 41 generates a representative vector which is a median value of the integrated vectors and generates a new group.

Figure 10:
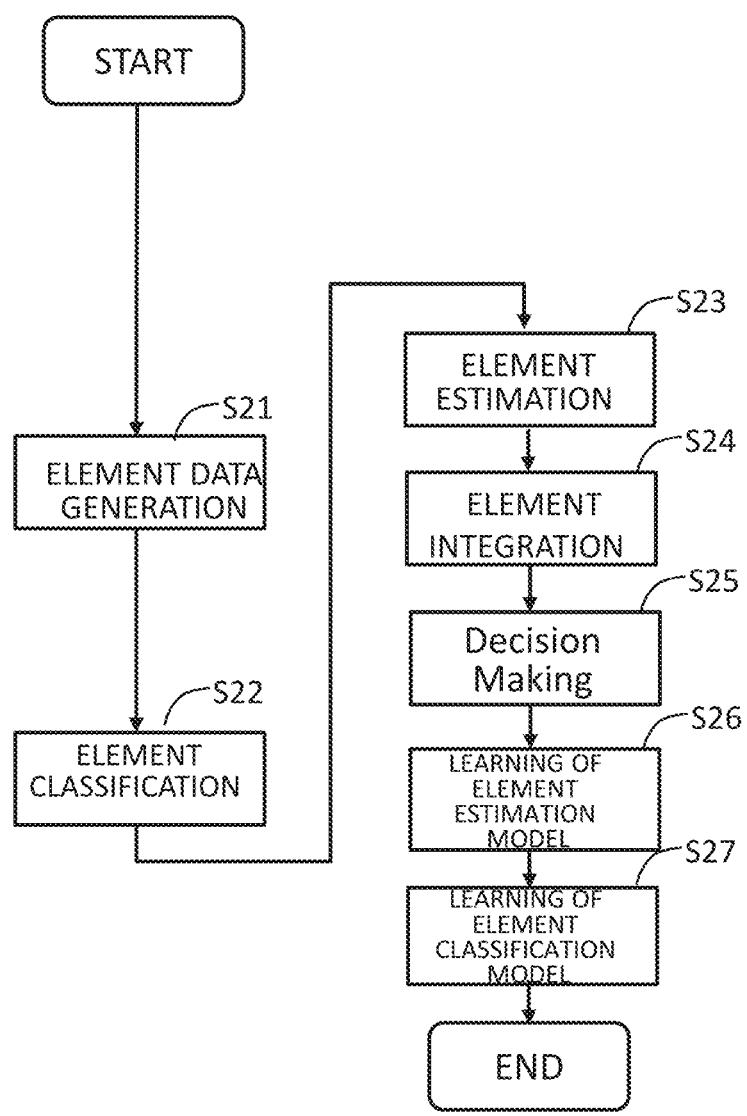
FIG. 10 is a flowchart for illustrating an operation example according to the second example embodiment.

Next, an operation of updating the element axis ($\phi$k) described with reference to FIG. 7 will be described with reference to FIG. 10. Steps S21 to S24 are the same as steps S11 to S14 in FIG. 9, respectively.

There are cases in which, while a group is not constituted when evaluation is performed on all the element axes, the condition of generating a group is satisfied when evaluation is performed on only a fixed number of axes. In such cases, the determination part 42 temporarily generates a group ID and feeds back the group ID to the element estimation model learning part 31 and the element classification model learning part 21 (step S25).

For example, there is such a case where, while convergence to an existing type can be achieved on the color axis and the object axis, convergence to an existing type cannot be achieved on the texture axis (k=1). Namely, there is a case where a probability p1$i$ of an existing type does not exceed a threshold.

On reception of a group ID that has been temporarily generated and fed back, the element estimation model learning part 31 can add a new type ($\phi$14=4: fourth item of type $\phi$k(k=1), a value thereof is set to 4) (step S26).

The element estimation model learning part 31 may create p14($\phi$14|X1) by using the input element classification X1 that converge to the same type on the color axis and the object axis and update a probability p1 of the texture axis. A value obtained by incrementing the maximum value of the existing type is used as a value given to the new type. The value of the added type can be given from outside, and whether learning is performed or not can be instructed.

On reception of the group ID that has been fed back and temporarily generated, the element classification model learning part 21 updates the element classification model on the axis on which convergence cannot be achieved by using the temporarily generated group ID as a correct answer label (step S27). The correct answer label can be given from outside of the apparatus via the input apparatus 10, and whether learning is performed or not can be instructed. The input apparatus 10 may be a communication interface (a receiver of a transceiver) that receives data from the outside, or an input interface including a keyboard, or the like.

Figure 11:
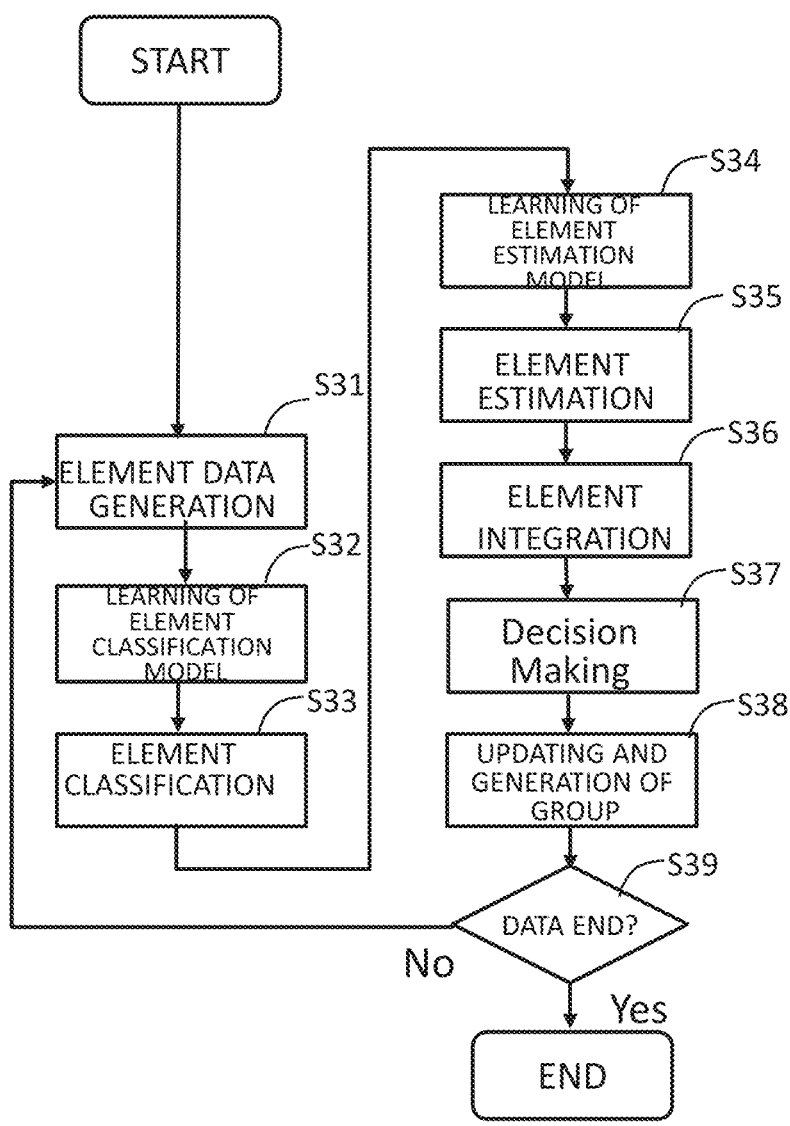
FIG. 11 is a flowchart for illustrating an operation example according to the second example embodiment.

Next, an operation of performing prior learning according to the second example embodiment will be described with reference with FIG. 11. Steps S31, S33, S35, S36, and S37 are the same as steps S11, S12, S13, S14, and S15 in FIG. 9, respectively.

The element classification model learning part 21 learns an element classification model by using data generated by the element data generation part 25 (step S32). When the classification is performed by using a neural network, a weight of the neural network may be learned by using a correct answer label.

The element estimation model learning part 31 creates pki($\phi$ki|Xk) and pk($\phi$k|Xk) from classification information Xk generated by the element classification part 23 and the correct answer label (type $\phi$ki) (step S34).

The group updating and generation part 41 generates a median value of the integrated vectors that have the same correct answer label (group ID) and that have been generated by the element integration part 34 as a representative vector and generates a group (step S38).

Whether learning data ends is determined (step S39). Steps S31 to S38 are repeated until there is no learning data.

In FIG. 5, when the additional data 13 is not appended, the element integration part 34 may be removed, and the output of the element estimation part 33 may be outputted to the determination part 42.

Third Example Embodiment

Figure 12:
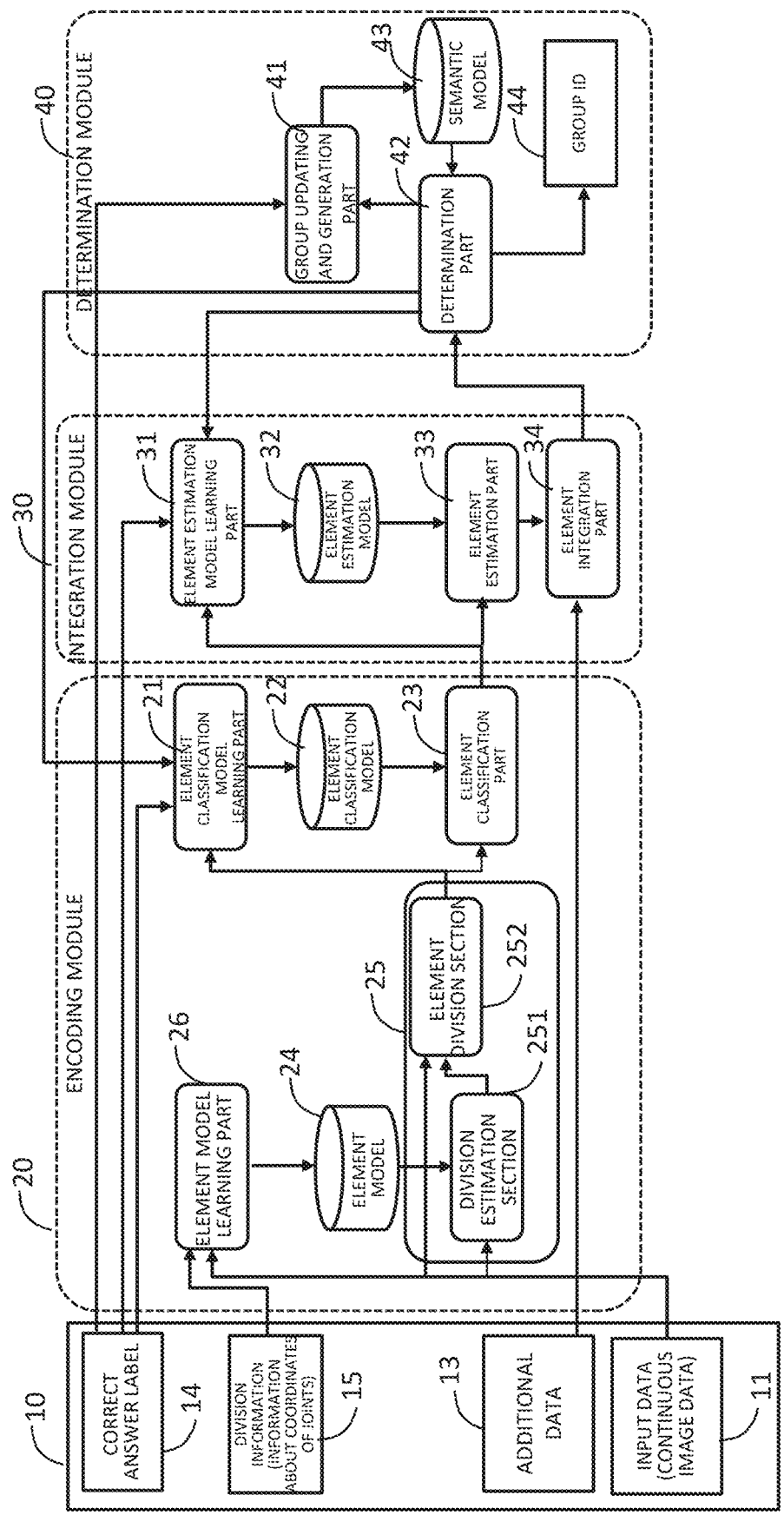
FIG. 12 is a diagram illustrating a configuration example according to a third example embodiment.

FIG. 12 illustrates a configuration according to a third example embodiment of the present invention. As illustrated in FIG. 12, an element data generation part 25 includes a division estimation section 251 and an element division section 252. The division estimation section 251 receives, for example, input data such as continuous image data and extracts a feature(s) for dividing the input data.

The extracted division feature(s) are stored in a storage apparatus 24 as an element model. The division estimation section 251 refers to the element model in the storage apparatus 24 when performing the division estimation.

The element division section 252 divides and outputs the input data based on the division feature(s). An encoding module 20 may further include an element model learning part 26. The element model learning part 26 can create an element model from the input data and the division information.

Though not limited thereto, an example is assumed where continuous image data of an animal, as input data 11;
information on joint coordinates, as division information 15; and
a kind of animal, as a correct answer label 14.

An animal can roughly be approximated by a multi-joint rigid body based on its skeleton. For example, an animal can be expressed as an object in which rigid body parts such as a face, a neck, a trunk, legs, and a tail are connected at joints. If the joint coordinates are known, individual parts can be divided from each other.

The correspondence between joint coordinates and parts are given in advance. In this case, the division estimation section 251 extracts the joint coordinates as a division feature.

The element model learning part 26 creates an element model based on image data, which is the input data, and information on the joint coordinates, which corresponds to the division information 15.

For example, the element model learning part 26 may receive image data, perform learning using, for example, deep learning technology with the information on the joint coordinates as training data, and store a learned network model in the storage apparatus 24 as an element model.

When learning is not performed, the element model learning part 26 generates joint coordinates having a large error for the image data received. The element model learning part 26 creates a model in such a manner that the error would be minimized.

The element division section 252 divides the input data 11 (image) into element images based on the division information (joint coordinates).

For example, the element images are images corresponding to a face, a neck, a trunk, legs, a tail, etc.

An element classification part 23 classifies the element images obtained by dividing the input data 11. For example, the element classification part 23 may perform the classification by using deep learning technology. A learned model by an element classification model learning module may be used as a network model. Alternatively, a learned model learned by using a general image may be used. Output of the element classification part 23 may be, for example, a data aggregate having classification probabilities as elements thereof.

An element classification model learning part 21 can build an element classification model based on an element image and a correct answer label.

For example, the element classification model learning part 21 receives the element images, performs learning by using deep learning technology on a per-element basis (per face, neck, trunk, leg, tail) by using part labels (for example, a striped leg, a reticulated trunk, etc.) as training data, and stores the learned network model, as element classification model.

Figure 13A:
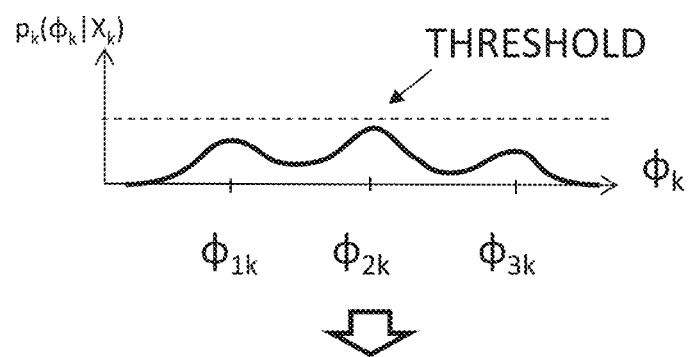
FIG. 13A is a diagram illustrating the third example embodiment.
Figure 13B:
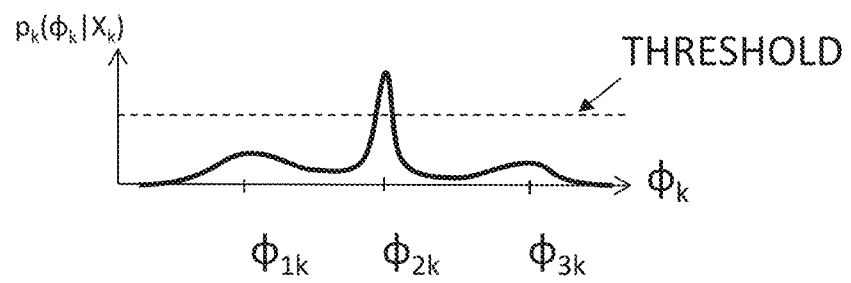
FIG. 13B is a diagram illustrating the third example embodiment.

An element estimation model learning part 31 may adaptively update probabilities $pki(\phi ki|Xk)$ and $pk(\phi k|Xk)$, each time data is inputted. Regarding an estimation result obtained by the element estimation part 33, a probability for a specific type is expected to increase gradually, if plural items of known data of the same kind are continuously inputted (see FIGS. 13A and 13B). FIG. 13B illustrates that a probability for a specific type $\phi 2k$ increases as compared with that in FIG. 13A.

For example, a probability for a specific type increases in such a case where a video of the same tiger is inputted. No result may be outputted while the probability $pk(\phi k|Xk)$ is below a threshold in any region. A representation expression vector may be outputted when the probability $pk(\phi k|Xk)$ exceeds the threshold. Regarding an element estimation part 33, even when plural items of data of the same kind are inputted continuously and stored, if the probability $pk(\phi k|Xk)$ or the probability $pki(\phi ki|Xk)$ of any type $\phi ki$ does not exceed a threshold, an element estimation model learning module can add a type or perform updating so that convergence to an existing type is achieved.

An element integration part 34 can integrate an expression vector of texture, color, shape, etc. with a representation expression vector of the element image. It is noted that the above example has been described assuming that the input data is image, but the input data is not, as a matter of course, limited to image.

Next, an operation according to the third example embodiment will be described with reference to FIG. 14.

The following describes an operation example in which adaptive learning is performed. The division estimation section 251 receives image data and extracts joint coordinates (step S41). For example, the division estimation section 251 estimates joint coordinates by using deep learning technology.

The element division section 252 divides the input image into element images, each of which includes a part including joints at both ends, based on the joint coordinates (step S42). The correspondence between the joint coordinates and the parts is given in advance.

The element classification part 23 classifies each of the divided element images (step S43). For example, the element classification part 23 estimates element classification by using deep learning technology.

The element estimation model learning part 31 updates probabilities $pki(\phi ki|Xk)$ and $pk(\phi k|Xk)$, each time data is inputted (step S44).

The element estimation model learning part 31 determines whether the probability $pk(\phi k|Xk)$ exceeds a predetermined threshold (step S45).

If the probability $pk(\phi k|Xk)$ exceeds the threshold (Yes in step S45), the element estimation part 33 generates a representation expression vector by using the probability $pk(\phi k|Xk)$ and outputs the representation expression vector to the element integration part 34 (step S46). If the probability $pk(\phi k|Xk)$ does not exceed the threshold, whether plural items of data of the same kind have been accumulated is determined (step S50). If plural items of data of the same kind have not been accumulated (No in step S50), the processing returns to step S41.

If the probability $pk(\phi k|Xk)$ does not exceed the threshold in any region, even when plural items of data of the same kind are continuously inputted (Yes in step S50), the element estimation model learning part 31 adds a type (step S51), and the processing returns to step S41.

The element integration part 34 can integrate a representation expression vector of texture, color, shape, etc. with a representation expression vector of the element image (step S46).

Steps S47 and S48 are the same as steps S15 and S16 in FIG. 9, respectively.

Next, whether there is no learning data or not is determined (step S49). Steps S41 to S48 (also steps S50 and S51 as needed) are repeated until there is no learning data.

In FIG. 12, in a case where additional data 13 is not appended, the element integration part 34 may be removed, and the output of the element estimation part 33 may be outputted to a determination part 42.

According to the example embodiments, input data is divided into collective elements, a division element (divided element) is converted to an interpretable expression, and an expression vector having the interpretable expression as an element is grouped on a semantic space. Operation on the expression(s) of the division element(s) and the group(s) on the semantic space are performed in a coordinated manner.

As a result, it is made possible to enhance stimulus discrimination ability and to newly acquire a recognition and classification group.

Since a division element has a relatively simple feature with respect to an overall environmental stimulus, coordination with another axis achieves autonomous acquisition of an expression of a division element. Evaluation of combination of the expressions of division elements can contribute to improvement of discriminability. By converting a division element to an expression of a type value additionally acquired, observation of autonomous formation of a group is made possible, and interference from outside is be made possible. By continuously modifying element expressions, more new groups can be acquired from a small number of groups.

Figure 15:
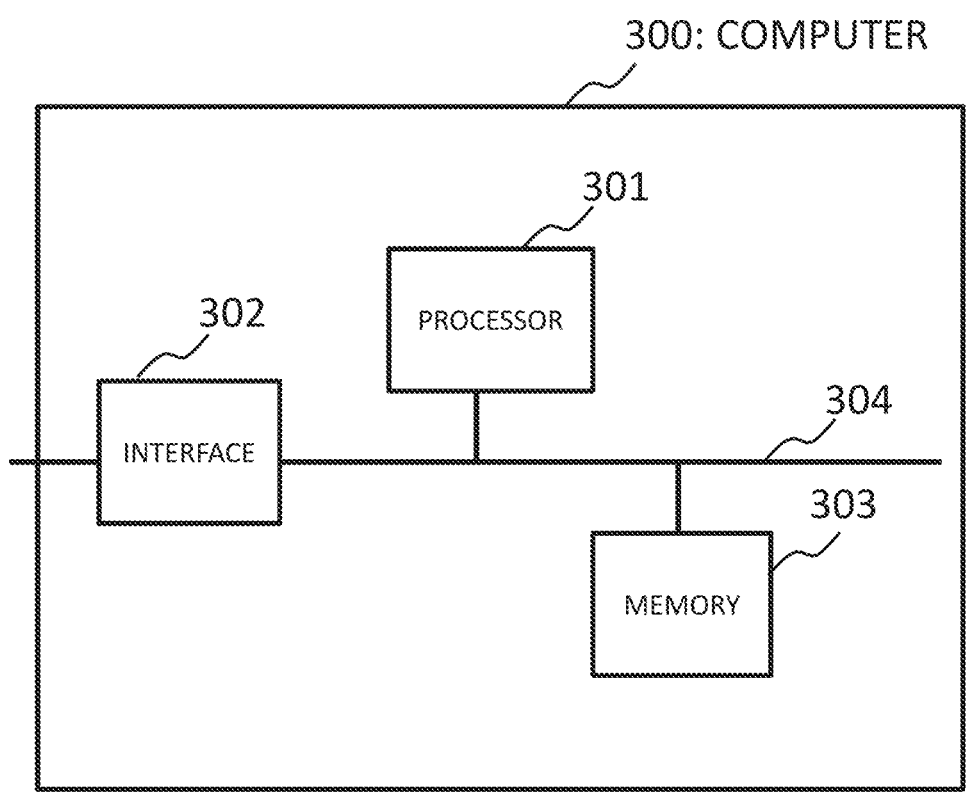
FIG. 15 is a diagram illustrating an example according to a fourth example embodiment.

An individual one of the means (an individual one of the processing parts) according to the above example embodiments can be configured by hardware such as an integrated circuit (IC) and/or software. For example, an individual one of the means described above is configured by a computer. FIG. 15 illustrates a hardware configuration example of a computer apparatus (classification apparatus) 300 as the computer. The computer apparatus 300 includes a processor 301, an interface 302, and a memory 303, which are connected to each other via a bus 304. The interface 302 is used by data input-output means for data exchange. For example, a network device, a file device, or a sensor device is connected to the interface 302. The processor 301 inputs and outputs various kinds of information via the interface 302. The processor 301 executes a program stored in the memory 303. For example, the memory 303 includes a main memory that holds a program executed by the processor 301. The program stored in the memory 303 includes instructions (instruction codes) processed by the processor 301, to realize execution of processing of the individual means. The processor 301 may include a memory that holds instructions to be executed.

The classification apparatuses according to the example embodiments (including encoding modules 20, integration modules 30, and determination modules 40) may be realized by causing a corresponding processor 301 to execute a program for corresponding processing. Alternatively, the encoding module 20, the integration module 30, and the determination module 40 may be realized respectively by the computer apparatuses 300 in FIG. 15.

The program executed by the processor 301 may be stored in any of various types of non-transitory computer-readable medium and supplied to a computer. Examples of the non-transitory computer-readable medium include various types of tangible storage medium. For example, the non-transitory computer-readable medium is a magnetic storage medium (for example, a flexible disk, a magnetic tape, or a hard disk drive), a magneto-optical storage medium (for example, a magneto-optical disk), a CD-ROM (read-only memory), a CD-R, a CD-R/W, or a semiconductor memory (for example, a mask ROM, a programmable ROM (PROM), an erasable PROM (EPROM), a flash ROM, or a random access memory (RAM)). Alternatively, the program may be supplied to a computer via any of various types of transitory computer-readable medium. Examples of the transitory computer-readable medium includes an electrical signal, an optical signal, and an electromagnetic wave. The transitory computer-readable medium may supply the program to a computer via a wired communication path such as an electrical wire or an optical fiber or a wireless communication path.

In FIG. 2, FIG. 3A, FIG. 4, FIG. 5, and FIG. 12, the input apparatus 10 and the encoding module 20 may be implemented on a terminal, and the integration module 30 and the determination module 40 may be implemented on a server apparatus connected to communicate with the terminal. In this case, the server apparatus may be configured as a server that provides a cloud service.

While examples in which image information, etc. is classified have been described in the second and third example embodiments, the present invention is applicable to various kinds of apparatuses and systems, each of which extracts a feature from a signal (information) acquired by a sensing device, etc. and classify the feature.

The disclosure of the above PTL 1 is incorporated herein by reference thereto. Variations and adjustments of the example embodiment and example are possible within the scope of the overall disclosure (including the claims) of the present invention and based on the basic technical concept of the present invention. Various combinations and selections of various disclosed elements (including the elements in the claims, example embodiment, examples, drawings, etc.) are possible within the scope of the claims of the present invention. Namely, the present invention of course includes various variations and modifications that could be made by those skilled in the art according to the overall disclosure including the claims and the technical concept.

What is claimed is:

1. A classification apparatus, comprising:
a sensor configured to detect an external stimulus signal to electrically output sensing data;
a processor; and
a memory storing program instructions executable by the processor,
wherein the processor is configured to execute:
an encoding process that electrically receives the sensing data as input data from the sensor and performs an element classification process that extracts a feature of the input data and outputs classification information, based on an element classification model implemented by a neural network and stored in a first storage unit, wherein the classification information X is represented by a pair of first and second information elements X=(x1,x2), where the first information element x1 and the second information element x2 indicate a location of a peak in a waveform of the input data and a value of the peak, respectively;
an element classification model learning process that generates the element classification model based on inputted element data $\phi$ and $\psi$ and stores the element classification model in the first storage unit, wherein the element data includes a first set of locations of peaks of the input data and a second set of peak values corresponding to the peaks included in the first set;
an integration process that performs an element estimation process that receives the classification information X=(x1,x2) and converts the classification information to a collation vector Z=(z1,z2), based on an element estimation model stored in a second storage unit generated by an element estimation model learning process, wherein the element estimation model includes a probability p($\phi$|x1=a) which is a conditional probability with which the element data is $\phi$ when x1=a is given and a probability p($\psi$|x2=b) which is a conditional probability with which the element data is $\psi$ when x2=b is given for the inputted classification information X=(x1,x2); and
a determination process that determines a group to which the collation vector Z=(z1,z2) belongs by collating the collation vector Z=(z1,z2) with a representative vector of an individual group stored as a semantic model in a third storage unit to output a group ID of the group as a classification result, wherein
the element estimation model learning process generates the element estimation model based on the classification information and the element data to store the element estimation model in the second storage unit, wherein the element estimation model learning process learns the element estimation model by using, as input, the group ID outputted from the determination process.

2. The classification apparatus according to claim 1, wherein the determination process calculates a distance between the collation vector Z=(z1,z2) and the representative vector rg1=(g11,g12) of the individual group stored in the third storage unit as the semantic model to determine, when the distance is equal to or less than a predetermined value, the group ID to which the collation vector Z belongs, and wherein the determination process further performs
a group updating and generation process that construct the group from the collation vector and stores the group as the semantic model in the third storage unit, wherein the group updating and generation process generates a new group when the distance is more than the predetermined value.

3. The classification apparatus according to claim 1, wherein the integration process further performs the element estimation process that performs sampling of a first set of the element data $\phi k$ (k is a positive integer) and sets a sampled value as the element z1 of the collation vector Z, by finding a most probable $\phi$ with respect to x1=a, wherein the probability $p(\phi|x1=a)$ takes a largest value, and performs sampling of a second set of the element data $\psi k$ and sets the sampled value as the element z2 of the collation vector Z, by finding a most probable $\psi$ with respect to x2=b, wherein the probability $p(\psi|x2=b)$ takes the largest value.

4. The classification apparatus according to claim 1, wherein the encoding process further performs the element classification model learning process that generates the element classification model based on first and second sets of the element data $\phi$ and $\psi$, wherein the element data $\phi$ is constituted by the location of the peak of the waveform of the input data, and $\phi$ represents an ensemble of peak values corresponding to peak locations.

5. The classification apparatus according to claim 4, wherein the encoding process further performs an element data generation process that receives the waveform of the input data and converts the waveform of the input data to the element data needed for classification by the element classification process.

6. The classification apparatus according to claim 5, wherein the element data generation process performs:

a division estimation process that receives the input data and extracts a division feature used for dividing the input data based on an element model stored in a fourth storage unit; and an element division process that divides the input data based on the division feature and outputs the divided input data for supply to the element classification process.

7. A classification method performed by a computer, the method comprising:

an encoding process that includes:

electrically receiving sensing data as input data from a sensor, performing an element classification process that extracts a feature of the input data and outputs classification information, based on an element classification model implemented by a neural network and stored in a first storage unit, wherein the classification information X is represented by a pair of first and second information elements X=(x1,x2), where the first information element x1 and the second information element x2 indicate a location of a peak in a waveform of the input data and a value of the peak, respectively;

an element classification model learning process that includes generating element classification model based on inputted element data $\phi$ and $\psi$ and stores the element classification model in the first storage unit, wherein the element data includes a first set of locations of peaks of the input data and a second set of peak values corresponding to the peaks included in the first set;

an integration process that includes receiving receives the classification information X=(x1, x2) and converts the classification information to a collation vector Z=(z1,z2), based on an element estimation model stored in a second storage unit generated by an element estimation model learning process, wherein the element estimation model includes a probability $p(\phi|x1=a)$ which is a conditional probability with which the element data is $\phi$ when x1=a is given and a probability $p(\psi|x2=b)$ which is a conditional probability with which the element data is $\psi$ when x2=b is given for the inputted classification information X=(x1,x2);

a determination process that includes determining a group to which the collation vector Z=(z1, z2) belongs by collating the collation vector Z=(z1,z2) with a representative vector of an individual group stored as a semantic model in a third storage unit to output a group ID of the group as a classification result, and the element estimation model learning process generates the element estimation model based on the classification information and the element data to store the element estimation model in the second storage unit, wherein the element estimation model learning process learns the element estimation model by using, as input, the group ID outputted from the determination process.

8. The classification method according to claim 7, wherein the determination process includes:

calculating a distance between the collation vector Z=(z1, z2) and the representative vector rg1=(g11,g12) of the individual group stored in the third storage unit as the semantic model to determine, when the distance is equal to or less than a predetermined value, the group ID to which the vector Z belongs; and constructing the group from the collation vector and storing the group as the semantic model in the third storage unit, while generating a new group when the distance is more than the predetermined value.

9. The classification method according to claim 7, wherein the integration process includes:

performing sampling of a first set of the element data $\phi k$ (k is a positive integer) and sets a sampled value as the element z1 of the collation vector Z, by finding a most probable $\phi$ with respect to x1=a, wherein the probability $p(\phi|x1=a)$ takes a largest value; and performing sampling of a second set of the element data $\psi k$ and sets the sampled value as the element z2 of the collation vector Z, by finding a most probable $\psi$ with respect to x2=b, wherein the probability $p(\psi|x2=b)$ takes the largest value.

10. The classification method according to claim 7, wherein the encoding process includes performing an element classification model learning process that generates the element classification model based on first and second sets of the element data $\phi$ and $\psi$, wherein the element data $\phi$ is constituted by the location of the peak of the waveform of the input data, and $\phi$ represents an ensemble of peak values corresponding to peak locations.

11. The classification method according to claim 10, wherein the encoding process further includes performing an element data generation process that receives the waveform of the input data and converts the waveform of the input data to the element data needed to create classified information.

12. The classification method according to claim 11, wherein the element data generation process includes:

performing a division estimation process that receives the input data and extracts a division feature used for dividing the input data based on an element model stored in a fourth storage unit; and performing an element division process that divides the input data based on the division feature and outputs the divided input data for supply to the element classification process.

13. A non-transitory computer-readable medium storing a program causing a computer to execute:
an encoding process that includes:
electrically receiving sensing data as input data from a sensor,
performing an element classification process that extracts a feature of the input data and outputs classification information, based on an element classification model implemented by a neural network and stored in a first storage unit, wherein the classification information X is represented by a pair of first and second information elements X=(x1,x2), where the first information element x1 and the second information element x2 indicate a location of a peak in a waveform of the input data and a value of the peak, respectively;
an element classification model learning process that includes
generating the element classification model based on inputted element data $\phi$ and $\psi$ and stores the element classification model in the first storage unit, wherein the element data includes a first set of locations of peaks of the input data and a second set of peak values corresponding to the peaks included in the first set;
an integration process that includes
receiving receives the classification information X=(x1, x2) and converts the classification information to a collation vector Z=(z1,z2), based on an element estimation model stored in a second storage unit generated by an element estimation model learning process, wherein the element estimation model includes a probability $p(\phi|x1=a)$ which is a conditional probability with which the element data is $\psi$ when x1=a is given and a probability $p(\psi|x2=b)$ which is a conditional probability with which the element data is when x2=b is given for the inputted classification information X=(x1,x2);
a determination process that includes
determining a group to which the collation vector Z=(z1, z2) belongs by collating the collation vector Z=(z1,z2) with a representative vector of an individual group stored as a semantic model in a third storage unit to output a group ID of the group as a classification result, and
the element estimation model learning process generates the element estimation model based on the classification information and the element data to store the element estimation model in the second storage unit, wherein the element estimation model learning process learns the element estimation model by using, as input, the group ID outputted from the determination process.

14. The non-transitory computer-readable medium according to claim 13, wherein the determination process further includes:
a process that calculates
calculating a distance between the collation vector Z=(z1, z2) and a representative vector rg1=(g11,g12) of the individual group stored in the third storage unit as the semantic model to determine, when the distance is equal to or less than a predetermined value, the group ID to which the vector Z belongs; and
a group updating and generation process that constructs the group from the collation vector and storing the group as the semantic model in the third storage unit, while generating a new group when the distance is more than the predetermined value.

15. The non-transitory computer-readable medium according to claim 13, wherein the integration process further includes
performing sampling of a first set of the element data $\phi k$ (k is a positive integer) and sets a sampled value as the element z1 of the collation vector Z, by finding a most probable $\phi$ with respect to x1=a, wherein the probability $p(\phi|x1=a)$ takes a largest value; and
performing sampling of a second set of the element data $\psi k$ and sets the sampled value as the element z2 of the collation vector Z, by finding a most probable $\psi$ with respect to x2=b, wherein the probability $p(\psi|x2=b)$ takes the largest value.

16. The non-transitory computer-readable medium according to claim 13, wherein the encoding process further includes
an element classification model learning process that generates the element classification model based on first and second sets of the element data $\phi$ and $\psi$, wherein the element data $\phi$ is constituted by the location of the peak of the waveform of the input data, and $\phi$ represents an ensemble of peak values corresponding to peak locations.

17. The non-transitory computer-readable medium according to claim 16, wherein the encoding process further includes
an element data generation process that receives the waveform of the input data and converts the waveform of the input data to the element data needed for classification in the element classification process.

* * * * *